Nov. 22, 1960  H. A. DZAACK  2,961,647
DEVICE FOR RECORDING AND ADDING MEASURE
UNITS, PARTICULARLY WEIGHT UNITS
Filed June 22, 1956  3 Sheets-Sheet 1

INVENTOR
*H. A. DZAACK*

ATTORNEYS

Nov. 22, 1960

H. A. DZAACK 2,961,647

DEVICE FOR RECORDING AND ADDING MEASURE
UNITS, PARTICULARLY WEIGHT UNITS

Filed June 22, 1956

INVENTOR
H. A. DZAACK

ATTORNEYS

Nov. 22, 1960

H. A. DZAACK 2,961,647

DEVICE FOR RECORDING AND ADDING MEASURE
UNITS, PARTICULARLY WEIGHT UNITS

Filed June 22, 1956

INVENTOR
*H. A. DZAACK*

BY
ATTORNEYS

United States Patent Office 2,961,647
Patented Nov. 22, 1960

2,961,647

DEVICE FOR RECORDING AND ADDING MEASURE UNITS, PARTICULARLY WEIGHT UNITS

Heinz Adolf Dzaack, Eskilstuna, Sweden, assignor to Kooperativa Forbundet Ekonomisk Forening, Stockholm, Sweden Filed June 22, 1956, Ser. No. 593,195

Claims priority, application Sweden June 23, 1955

6 Claims. (Cl. 340—347)

This invention relates to a device for determining measure units indicated on a measuring scale and transmitting said units to a recording machine which, for example, may store the information fed to it for future use, may print the information or may sum up several sets of information and then print or record the result. In known apparatus for performing this function the investigation and interpretation of the reading indicated on a measuring scale must be completed and recorded before the measuring scale, which may be a weighing machine, may be prepared for a subsequent reading. The present invention seeks to overcome this disadvantage.

According to the present invention, a measuring device which includes a movable member settable with respect to a reference position and in accordance with a value to be measured, and which member has a plurality of feeling means thereon corresponding respectively to the different numbers in a plurality of decades with feelers at the reference position engageable with the feeling means, is characterized by a relay for each number in each decade, contacts operated by the feelers upon engagement with the corresponding feeling means when moved to the reference position for respectively energizing a corresponding relay, a pair of contacts which are closed upon energization of each relay respectively, one contact of each pair corresponding to a given number in each decade, being connected to a respective first common lead, the other contact of each pair in a respective decade, being connected to a second common lead, an adding device having a magnet for registering each number and connected to a respective first common lead, and a programming device for sequentially connecting each of the second common leads to a source of power.

The invention is illustrated in the accompanying drawings, in which.

Figure 1:
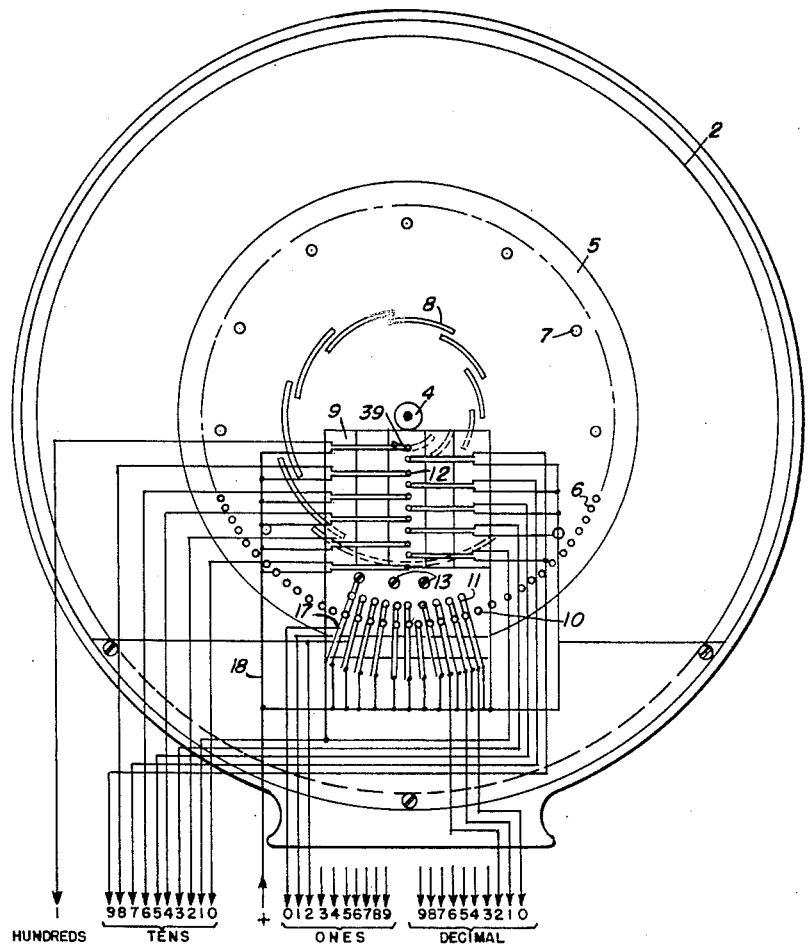
Figure 1 shows a rear view of a head of a weighing scale or balance.
Figure 4:
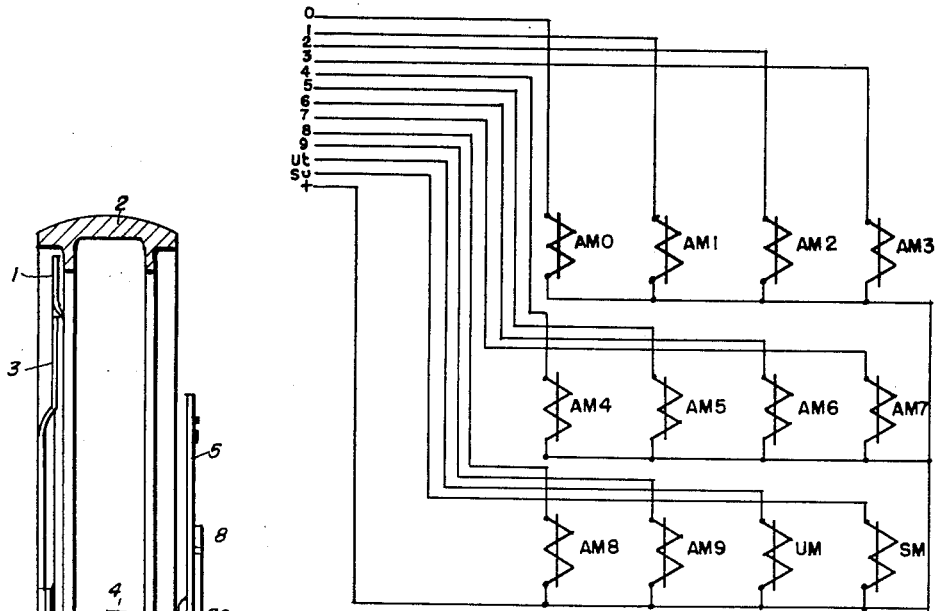
Figure 4 shows a circuit diagram of a recording or printing machine.
Figure 2:
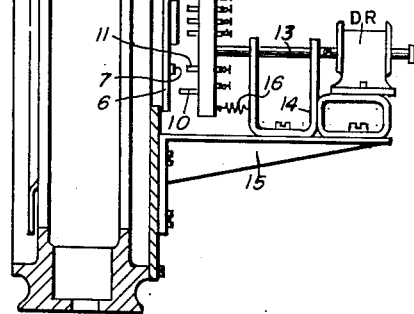
Figure 2 shows a side elevation of the head shown in Figure 1.
Figure 5:
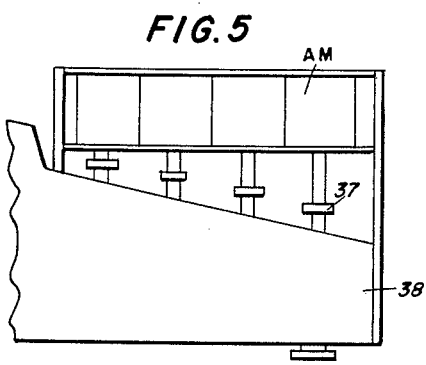
Figure 5 shows the printing keys and their operating solenoids of the recording or printing machine.

Considering a weighing machine having a capacity of 100 kilogrammes, a scale ring 1 which is attached to a hood 2 is divided into increments of 100 grammes up to 100 kg. A pointer 3 attached to a rotatable shaft 4 is set in known manner according to the weight placed on a weighing bridge (not shown). A movable member in the form of a disc 5 is attached to the shaft 4. The disc 5 is provided with engagement means comprising holes 6 and projections 7 and 8. The distance between the holes 6 corresponds to the 100 grammes divisions on the scale ring 1. The projections 7 are arranged in a circular path on the disc 5 and are in the form of upstanding pins. The projections 7 are spaced a distance corresponding to the "ones" kg. divisions of the scale but are adapted as will be described hereinafter to record individual kg. divisions of the scale. The projections 8 are in the form of arcuate raised strips or bars and are adapted for recording the "ten" kg. divisions of the scale. The number of the projections 8 corresponds to the number of 10-kg.-divisions. These projections have a length greater than the angle that corresponds to the divisions of 10 kg. and therefore they overlap as seen in Figure 1. A displaceable holder 9 is mounted opposite the disc 5 and carries feeler members or pins 10, 11, 12, 39. The holder 9 is attached by rods 13 slidably mounted in a U-shaped support 14 to a solenoid DR. The support 14 and solenoid DR are carried by a bracket 15. The solenoid DR is arranged positively to move the holder 9 from an inoperative position shown in Figure 2 where the pins 10, 11, 12 and 39 are disposed away from the disc 5 or feeling means 6, 7 and 8 to an operative position where the pins engage with said means 6, 7 and 8 as will be described hereinafter. A tension coil spring 16 is connected between the holder 9 and support 14 and biases the holder 9 to its inoperative position; thus when the solenoid DR is released or rendered inoperative the holder 9 is automatically moved to its inoperative position.

The pins 10 and holes 6 are mutually arranged according to a vernier principle, the spacing of the pins being nine-tenths of the spacing of the holes. When the holder 9 is moved by the solenoid DR to its operative position one or two of the pins 10 will come into engagement with one or two of the holes 6; one or two of the pins 11 will stand against one of the projections 7; and one or two of the pins 12 or when the weight being recorded is 100 kg. two pins 12 and the pin 39 will stand against a bar 8.

Figure 3:
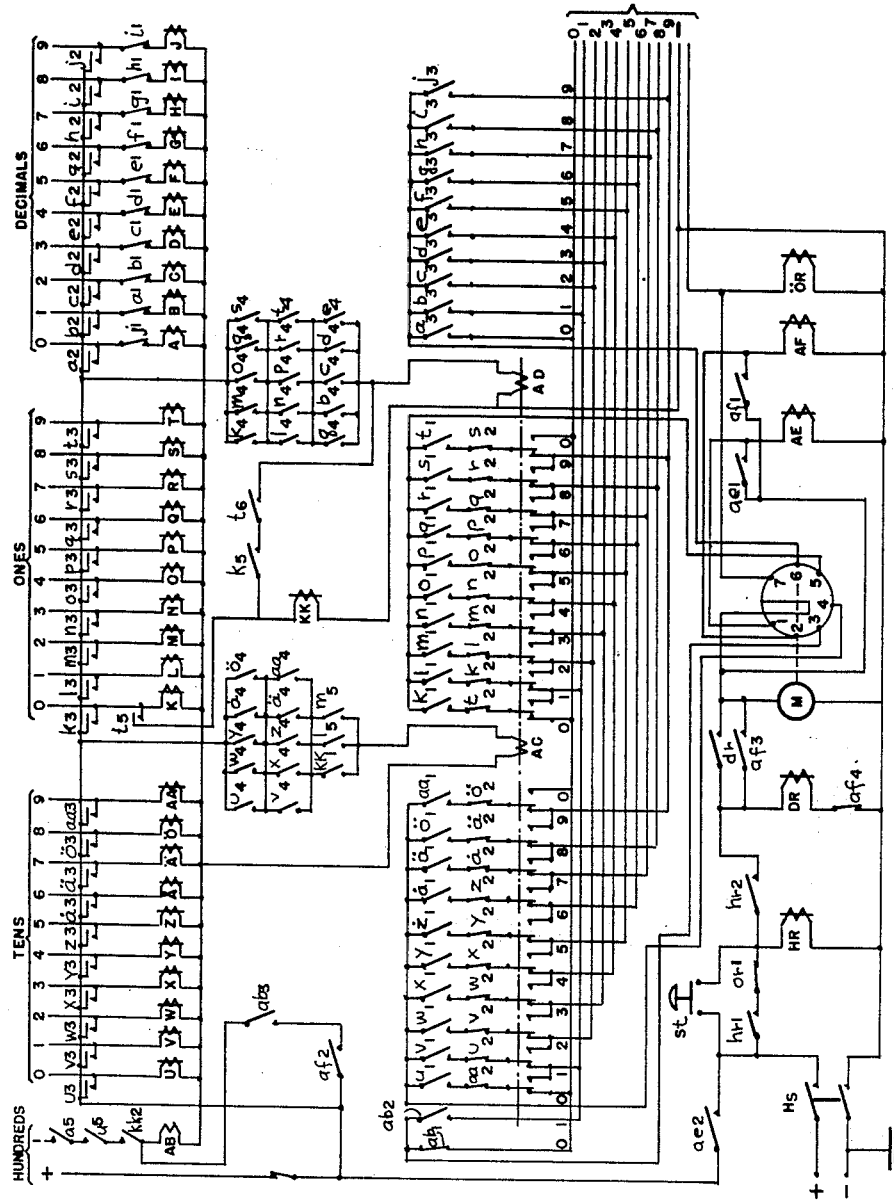
Figure 3 shows a circuit diagram of one embodiment of the invention.

Each of the pins 10, 11, 12 and 39 on the holder 9 cooperates with a pair of contact springs 17. The contact springs 17 of the pins 10 are normally closed and the contact springs 17 of the pins 11, 12 and 39 are normally open. It thus follows that when the pin holder 9 is moved into its operative position the contacts 17 of those pins 10 which do not enter the holes 6 in the disc 5, but bear against the surface of said disc, are opened whilst the contacts 17 of the pins 10 which do enter holes 6 remain closed. The contacts 17 of the pins 11, 12 and 39 which stand against projections 7 and 8 are closed whilst the remaining contacts of said pins stay open. All the corresponding contacts of the pairs of contact springs have a common wire 18 which is connected to the positive of a source of electric current. The other contacts of the pairs of contact springs are connected to their respective operating means, thus (see Figure 3):

The contact spring 17 of the pin 39 which records the "hundred" kg. unit is connected to the relay AB.

The contact springs 17 of the pins 12 which record the "tens" kg. units are connected to the relays U—AA respectively.

The contact springs 17 of the pins 11 which record the "ones" kg. units are connected to the relays K—T respectively, and The contact springs 17 of the pins 10 which record the "decimal" kg. units are connected to the relays A—J respectively.

The relays are of well known construction and are provided with the necessary number of closing or opening contacts.

The contacts 17 actuated by the feelers of the respective decades are connected each with a corresponding relay A—J; K—T; U—AA, each of these relays is arranged when actuated to connect by means of contacts $a_3$—$j_3$; $k_1$—$t_1$; $u_1$—$aa_1$, to its respective wire, common to all decades, of the adding machine or the like. The relays, when actuated, also connect with the contacts 3—6 corresponding to the respective decades of a programme selector having a contact arm $m$. Each relay A—J of the lowest decade is arranged, when actuated, by means of contacts $a_1$—$j_1$ to disconnect an adjacent relay in said lowest decade. Furthermore each relay in the higher decades is arranged, when actuated, by means of break contacts $k_2$—$t_2$; $u_2$—$aa_2$ effetively to break the connection between, on one hand the common wire to the adding machine or the like corresponding to the next highest relay in the decade and on the other hand the programme selector contacts corresponding to the decade.

The relays A—J; K—T; U—AA are each provided with holding contacts $a_2$—$j_2$; $k_3$—$t_3$; $u_3$—$aa_3$ respectively. There is a parallel coupling of contacts $k_4$, $m_4$, $o_4$, $q_4$, $s_4$ of every second relay in the second decade in series with a parallel coupling of contacts $l_4$, $n_4$, $p_4$, $r_4$, $t_4$ of the other relays in this decade and with a parallel coupling of contacts $a_4$, $b_4$, $c_4$, $d_4$, $e_4$ of the relays A—E of the lowest decade. A change-over magnet AD is arranged when energized to change-over the connection of every break contact $k_2$—$t_2$ with the corresponding adding machine wire to the next higher common wire.

The wire between the first relay K of the second decade and the corresponding feeler contact 17 is connected with earth over a contact $t_5$ of the lowest relay T of the second decade and in series with an extra relay KK. This extra relay KK is in series with contacts $k_5$, $t_6$ of the first and last relays K, T of the second decade and is in parallel connection with the change-over magnet AD. A parallel connection of contacts $u_4$, $w_4$, $y_4$, $a_4$, $ö_4$ of every second relay in the third decade is connected in series with a parallel connection of contacts $v_4$, $x_4$, $z_4$, $ö_4$, $aa_4$ of the other relays in said decade and with a parallel connection of contacts $kk_1$, $l_5$, $m_5$ of the said extra relay $KK_4$ and of the second two relays L, M of the second decade, and with a second change-over magnet AC. This second change-over magnet AC is arranged when energized to shift the connection of each break contact $aa_2$—$ö_2$ belonging to the third decade, with the corresponding adding machine wire to the wire corresponding to the next subsequent figure in that decade.

A wire for the feeler contact 17 of the first figure in the fourth decade is connected to a relay AB provided with a holding contact $ab_3$, in series with contacts $a_5$—$u_5$ of the first relays A, U in the first and third decades and to a contact $kk_2$ of the extra relay KK. With this arrangement the relay AB of the fourth decade is energized only when the measured value is in the fourth decade.

A connecting relay HR which can be energized by means of a starting contact St is provided with a holding contact $hr_1$ and a second contact $hr_2$ in series with the feeler magnet DR. Said magnet DR is provided with a contact $dr$ which when closed switches on a motor M for driving the programme selector. A first contact 1 of the program selector, which is provided with a contact arm $m$ is connected with a relay AE which is provided with a holding contact $ae_1$ and a second contact $ae_2$ for connecting in the contacts 17 of the feelers. A second contact 2 of the programme selector is connected to a relay AF which is provided with a holding contact $af_1$, a second contact $af_4$ for disconnecting the feeler magnet DR, a third contact $af_3$ for bridging the contact $dr$ of said magnet DR, a fourth contact $af_5$ for disconnecting the feeler contacts 17 and a fifth contact $af_2$ for connecting the holding circuit of the relay AB in the circuit of the feeler contact of the fourth decade. A third contact 3 of the programme device, via a normally closed contact $ab_1$ and a normally open contact $ab_2$ of the relay AB of the fourth decade, is connected to those of the wires of the adding machine or the like which correspond to the figures 0 and 1. A fourth, fifth and a sixth contact of the programme selector are arranged to the wires of the adding machine via the contacts $a_3$—$j_3$; $k_1$—$t_1$; $t_2$—$s_2$; $u_1$—$aa_1$; $aa_2$—$ö_2$, which wires respectively belong to the first, the second and the third decades of the units of measure. A seventh contact of the programme selector is connected to a release magnet of the adding machine or the like for recording the digits entered therein. The seventh contact of the programme selector preferably is connected to a relay ÖR which has a contact $ör_1$ for switching off the whole apparatus.

The mode of operation is as follows:

In zero position, that is that when the scale bridge is unloaded the recording shall indicate zero.

A main switch Hs is switched on. When the start button St is pressed the relay HR is energized and closes the switches $hr_1$ and $hr_2$. The relay HR thus receives a holding current over the switches $hr_1$ and $ör_1$. The switch $hr_2$ passes a current to the magnet DR which is energized and moves the pin holder 9 to its operative position and at the same time the circuit of the motor M is closed by the switch $dr$. Of the "decimal" pins 10 of the pin holder 9 the zero pin will come into engagement with the corresponding hole 6 in the feeling disc 5 so that the contact 17 of the zero pin remains closed. The other "decimal" pins 10 stand against the feeling disc 5 and the corresponding contacts 17 are therefore opened. The zero of the "ones" pins 11 stands on an elevation 7 and one "tens" pin 12 stand on the zero bar 8. The "hundred" pin 39 does not stand on a bar 8. The pins for "ones" and "tens" close their respective contacts 17.

The "decimal" zero contact 17 closes the circuit of the relay A. The zero "ones" pin closes the zero contact 17 and thus the circuit of the relay K. The "tens" pin closes the zero contact 17 and thus the circuit of the relay U. The "hundred" pin does not close its spring contact 17.

The motor M drives the contact arm $m$ of the program device in the counterclockwise direction over the contacts thereof. At the first contact of said device the relay AE is energized and holds itself over the switch $ae_1$ and also closes the switch $ae_2$.

It follows therefore that the following circuits are closed:

The "decimal" unit relay A which opens its switch $a_1$ and closes its switches $a_2$—$a_5$ (in the present case however only the switches $a_2$, $a_3$ and $a_4$ are of importance). Over the switch $a_2$ the relay A holds itself;

The "ones" unit relay K which opens its switch $k_2$ and closes its switches $k_1$, $k_3$, $k_4$ and $k_5$ (in the present case, however, only the switches $k_1$ and $k_3$ are of importance). The relay K holds itself over its switch $k_3$;

The "tens" unit relay U which opens its switch $u_2$ and closes its switches $u_1$, $u_3$, $u_4$ and $u_5$ (in the present case, however, only the switches $u_1$ and $u_3$ are of importance). The relay U holds itself over the switch $u_3$.

The relay KK also receives current since the switch $t_5$ is closed and closes the switches $kk_1$ and $kk_2$ which in the present case are of no importance. In the circuit of the relay AB of the "hundred" unit the switches $a_5$, $u_5$ and $kk_2$ are closed but as the contact 17 is opened this relay receives no current and thus the switch $ab_1$ is closed and the switch $ab_2$ is opened.

When the contact arm $m$ of the program device reaches the second contact thereof the relay AF is energized and holds itself by switch $af_1$. The switch $af_2$ closes the automatic holding circuit of the relay AB but in the present case the switch $ab_3$ is open. The switch $af_4$ opens the circuit of the magnet DR, whereby the switch $dr$ is opened, but the switch $af_3$ actuated by relay AF closes the circuit for the motor M, and the switch $af_5$ opens the circuit of the common wire 18. Since the magnet DR is released the spring 16 moves the pin holder 9 back to its initial inoperative position. The weight placed on the weighing bridge has now been felt and the disc 5 is free so that another weight or load can be placed on the weighing bridge whilst the preceding weight is recorded.

The motor M still has current over the switch $af_3$ and the arm $m$ continues to move and at the third contact which corresponds to the "hundred" unit a circuit is closed over the arm $m$, the third contact, and the switch $ab_1$ to the magnet 0 of the printing machine, which magnet is energized. When the contact arm $m$ reaches the fourth contact of the program device, which contact corresponds to the "tens" units a circuit is closed over the arm $m$, the fourth contact, the switch $u_1$, the switch $aa_2$ and the contact on the relay AC to the magnet 0 of the printing machine, which magnet is energized. When the contact arm $m$ reaches the fifth contact which corresponds to the "ones" units a circuit is closed over the arm $m$, the fifth contact, the switch $k_1$ which is closed, the switch $t_2$ and the contact on the relay AD to the magnet 0 of the printing machine, which magnet is energized. When the contact arm $m$ reaches the sixth contact of the program device, which contact corresponds to the "decimal" units, a circuit is closed over the arm $m$, the sixth contact and switch $a_3$ which is closed, to the magnet 0 of the printing machine, which magnet is energized. When the contact arm $m$ reaches the seventh contact which serves to release the apparatus a circuit is first closed over the arm $m$ and the seventh contact to a release magnet of the printing machine, which magnet is energized. The printing machine is now set into function and zero is recorded. The contact arm $m$ also closes a second circuit when it reaches the seventh contact over the arm $m$ and the seventh contact to the relay ÖR which is energized. Through the relay ÖR the switch $ör_1$ is opened and the relay HR is released opening the switches $hr_1$ and $hr_2$ thereby switching off the apparatus. The recording is over and a new recording can begin. As the pin holder left the disc 5 before the recording of zero weight had been completed the weighing bridge has had time to adjust itself to a new load and if this is for example 99.9 kg. the pointer 3 and the disc 5 have assumed a position corresponding to this weight. When the pin holder is moved to its operative position the following occurs:

"Decimal": The ninth decimal pin engages with the hole 6 in the disc 5 and the respective spring contact 17 is therefore closed;

"Ones": The ninth and zero pins stand against a projection 7 of the disc 5 whereby the corresponding contacts 17 of the ninth and zero pins are closed;

"Tens": The ninth and zero pins stand against their respective bars on the disc 5 and thus the corresponding contacts 17 are closed;

"Hundreds": The pin 39 stands against its respective bar on the disc 5 and the corresponding spring contact 17 is closed.

When the contact arm $m$ of the program device reaches the first contact thereof the relay AE receives a current impulse and holds itself over its switch $ae_1$. Through the switch $ae_2$ the common wire 18 is closed and the relay J is energized and holds itself over its switch $j_2$. The switch $j_3$ closes the sixth contact of the program device to the printing machine.

The "ones" unit relays K and T are energized and hold themselves respectively over the switches $k_3$ and $t_3$. The switches $k_1$ and $t_1$ close the fifth contact of the program device to the zero and ninth magnets of the printing machine but the switch $t_2$ disconnects the zero magnets so that only the ninth magnet remains connected.

The "tens" unit relays U and AA are energized as they are connected respectively to the zero and ninth contact 17 of the pins 12. The relay U holds itself over its switch $u_3$ and the switch $u_1$ closes the fourth contact of the program device to the zero magnet of the printing machine. The relay AA holds itself over its switch $aa_3$ and the switch $aa_1$ closes the fourth contact of the program device to the ninth magnet of the printing machine. The switch $aa_2$ however disconnects the zero magnet so that only the ninth magnet is connected. The "hundred" unit relay AB receives no current as the switch $a_5$ is open. The third contact of the program device is thus over the switch $ab_1$ connected to the zero magnet of the printing machine.

When the contact arm $m$ of the program device glides over the third-sixth contacts thereof electrical impulses are transmitted to the printing machine and the appropriate magnets thereof are energized. When the contact arm $m$ reaches the seventh contact of the program device the printing machine records the weight at the same time as the relay ÖR switches off the apparatus. A recording of 99.9 kg. is thus made.

If, for example, a weight of 100 kg. is to be recorded the following occurs:

The pins of the holder 9 close:

The zero "decimal" contact 17 closes whereby the relay A is energized and holds itself over its switch $a_2$ and the switch $a_3$ connects the sixth contact of the program device to the printing machine;

The zero and ninth "ones" contacts 17 close whereby the relays K and T are energized and hold themselves over their switches $k_3$ and $t_3$ respectively. The switches $k_1$ and $t_1$ connect the fifth contact of the program device to the printing machine but the switch $t_2$ breaks the connection to the zero magnet of said machine. This obviously would cause the printing machine to give an incorrect result and the necessary correction is made through the switches $k_4$, $t_4$ and $a_4$ which close the circuit of the relay AD so that it is energized. The relay AD is provided with ten shift contacts which when the relay is energized connect the wires from the switches $t_2$—$s_2$ to the closest high number, for example, 0 to 1 and 9 to 0. Hence when the relay AD is energized the wire from the switch $s_2$ is connected to the zero magnet of the printing machine;

The zero and ninth "tens" contacts 17 close whereby the relays U and AA are energized and hold themselves over their switches $u_3$ and $aa_3$ respectively. The switch $u_1$ is connected to the zero magnet of the printing machine and the switch $aa_1$ to the ninth magnet of said machine but the switch $aa_2$ disconnects the zero magnet. This is incorrect and the necessary correction is made by the switches $u_4$, $aa_4$ and $kk_1$ which close the circuit for the relay AC so that it is energized. The relay AC is provided with ten shift contacts which when said relay is energized connect the wires from the switches $aa_2$—$ö_2$ to the nearest high number in the same manner as the relay AD. Thus when the relay AC is energized the wire from the switch $ö_2$ is connected to the zero magnet;

The "hundred" contact 17 closes whereby the relay AB is energized over the switches $a_5$, $u_5$ and $kk_2$ and closes its switches $ab_2$ and $ab_3$ and opens its switch $ab_1$. Over the switch $ab_2$ the wire for the "hundred" unit is connected to the appropriate magnet of the printing machine and through the switch $ab_1$ the connection to the zero magnet is broken off. The relay AB holds itself when the relay AF has been energized to close its switch $af_2$.

The following magnets of the printing machine are connected for operation:

The 0 for the "decimal" unit;
The 0 for the "ones" unit;
The 0 for the "tens" unit; and
The 1 for the "hundred" unit.

Thus a result of 100 kg. is recorded and the apparatus is switched off in the manner hereinbefore described.

The invention is not restricted to the range of applications heretofore described and shown. Besides recording weights indicated on a weighing bridge the invention can be used for example in connection with testing machines for measuring volumes, and can be used in cases where measurements of length are to be recorded.

Several modifications are possible within the scope of the invention, for example, instead of a single printing machine two or more of such machines can be connected in parallel with each other or the printing machine may be replaced by a punch card apparatus. Also instead of operating the program device by means of a motor said device can also be actuated by means of a solenoid.

What I claim is:

1. In a measuring device including a movable member settable with respect to a reference position and in accordance with a value to be measured, said member having a plurality of feeling means thereon corresponding respectively to the different numbers in a plurality of decades, feelers at the reference position engageable with the feeling means, a relay for each number in each decade, contacts operated by the feelers upon engagement with the corresponding feeling means when moved to the reference position for respectively energizing a corresponding relay, a pair of contacts which are closed upon energization of each relay respectively, one contact of each pair corresponding to a given number in each decade, being connected to a respective first common lead, the other contact of each pair in a respective decade, being connected to a second common lead, an adding device having a magnet for registering each number and connected to a respective first common lead, and a programming device for sequentially connecting each of the second common leads to a source of power.

2. In a measuring device as in claim 1, including means operated by each relay in the lowest decade when energized, to maintain a relay corresponding to an adjacent number in the decade deenergized, and break contacts operated upon energization of each relay in the higher decades to break the connection between the second common lead of the respective decade and a first common lead corresponding to an adjacent number in the respective decade as counted in a given direction.

3. In a measuring device according to claim 2, further including a holding circuit rendered operative by each relay to maintain itself in energized condition.

4. In a measuring device according to claim 2, further including means connecting further contacts of alternate relays of the second decade in parallel, means connecting further relay contacts of the first decade in parallel, said parallel arrays of contacts being connected in series and a change-over magnet operable upon energization, to change over the connection of each break contact of the corresponding first common lead to an adjacent common lead connected to a registering magnet of an adjacent number as counted in the given direction.

5. In a measuring device according to claim 4, in which the lead between the first relay, in the said direction, of the second decade and its corresponding feeler contact are connected through further contacts of the last relay of said second decade in series with an extra relay to ground, said extra relay being connected at its terminal remote from ground, through a pair of series connected contacts of the first and last relays of the second decade in parallel with said change-over magnet, contacts of alternate relays of the third decade being connected in parallel, contacts of said extra relay, second and third relays in the same direction, of the second decade being connected in parallel, said parallel arrays of contacts being connected in series with a second change-over magnet, break contacts associated with the relays of the third decade for breaking the connection between the second common lead of the respective decade and a first common lead corresponding to an adjacent number in the decade as counted in the given direction, said second change-over magnet upon energization shifting the connection of the break contact to a subsequent common lead in the third decade.

6. In a measuring device in accordance with claim 5, in which the feeler contact for the fourth decade is connected to a relay, contacts operated by said last named relay to provide a holding circuit therefor, said contacts being connected in series with contacts of the first relays in the first and third decades and a contact of said extra relay, whereby said relay connected to the feeler of the fourth decade is energized upon engagement with the feeling means when the value to be measured is 100.0.

References Cited in the file of this patent
UNITED STATES PATENTS

| | | |
|---|---|---|
| 2,101,452 | Rauch | Dec. 7, 1937 |
| 2,116,086 | Van Berkel | May 3, 1938 |
| 2,367,234 | DeCastro | May 15, 1945 |
| 2,385,323 | Williams | Sept. 18, 1945 |
| 2,577,820 | Singleton | Dec. 11, 1951 |
| 2,591,555 | Klopf | Apr. 1, 1952 |
| 2,666,912 | Gow | Jan. 19, 1954 |
| 2,736,006 | Langerin | Feb. 21, 1956 |
| 2,750,584 | Goldfischer | June 12, 1956 |
| 2,755,020 | Belcher | July 17, 1956 |
| 2,766,445 | Bland | Oct. 9, 1956 |